250/203

United States Patent [19]

Reilly et al.

[11] 3,833,812

[45] Sept. 3, 1974

[54] STABILIZATION SYSTEM FOR AIRBORNE SCANNERS

[75] Inventors: Frank N. Reilly, Plano; Jesse C. Wilson; Charles P. Cole, both of Richardson, all of Tex.

[73] Assignee: Texas Instruments Incorporated, Dallas, Tex.

[22] Filed: Apr. 12, 1973

[21] Appl. No.: 350,565

[52] U.S. Cl. .................................. 250/330, 250/203

[51] Int. Cl. .............................................. G01j 5/00

[58] Field of Search ........... 250/338, 340, 342, 349, 250/203, 330; 356/4, 141

[56] References Cited

UNITED STATES PATENTS 3,714,432 1/1973 Jaink, Jr. ........................... 250/340

*Primary Examiner*—James W. Lawrence
*Assistant Examiner*—Davis L. Willis
*Attorney, Agent, or Firm*—Harold Levine; Rene E. Grossman; Alva H. Bandy

[57] ABSTRACT

A system is provided for achieving stabilization and image derotation of an airborne scanner. The system includes a multichannel scanner, each channel producing a series of signals as a desired area is scanned. The relative time location of the signals in the various channels varies according to the scan position. A charge transfer device shift register is provided for receiving the output of each channel. Each shift register is in turn controlled by a variable frequency source for sampling the output of the scanner at a variable rate. The variable rate for each shift register is different and is related to the scan position such that rotation components of the scanner are eliminated. In a preferred embodiment, the output of the shift-registers is advantageously connected to a light-emitting-diode display.

10 Claims, 10 Drawing Figures

STABILIZATION SYSTEM FOR AIRBORNE SCANNERS

The present invention pertains to airborne scanner systems in general, and more particularly to such a system which includes charge transfer device shift registers having variable clock rates for eliminating rotation and distortion components from the system output.

In airborne scanner systems, such as infrared line scanners, it is often necessary to stabilize electronic imaging systems against aircraft motion in order to prevent unwanted distortion in the recording medium. Depending upon the system performance and resolution, the stabilization may be required to counteract or compensate for roll, pitch and yaw motion.

For many systems, roll stabilization is all that is required.

Implementation of roll stabilization can be performed in a number of ways. One concept is mass stabilization where the entire system is gimballed and stabilized about the roll axis by motor drive and gyro inputs. If the system has a remote display or recorder (mechanical or CRT), roll compensation can be performed by changing the phase or position of the recorder with respect to the scanner. Roll compensation is the best method for reasonable roll angles; however, the remote recorder concept is sometimes a disadvantage from the standpoint of synchronization electronics, jitter between scans, and size.

Therefore, an optimum system for many applications would be a system with a hard shaft coupled recorder utilizing roll compensation as the method of stabilization.

Another problem common with airborne scanner systems pertains to image rotation in multichannel infrared systems which utilize a single or double face oblique scan mirror or individual rotating telescopes. This rotation of the detector image on the ground as a function of scan angle requires correction or compensation in the film recorder. This correction can be performed by utilization of a remote CRT film recorder where the CRT image can be rotated as a function of scan or recording position. With mechanical recorders (remote or hard shaft) it is not feasible to use Light Emitting Diodes (LED's) with this style scanner since nonlinear mechanical or optical motion would be required at a very high rate.

Thus, it can be seen that for many applications the need arises for an infrared system with a hard shaft recorder and roll compensation to save on size, weight and complexity. However, for a scanner with image rotation, it is very difficult to implement these two features, roll stabilization and image derotation, in a hard shaft infrared system.

Accordingly, an object of the invention is the provision of an improved airborne scanner system having means for correction for aircraft motion and image rotation.

Another object of the invention is the provision for a hard shaft airborne scanner system having semiconductor charge transfer device means for implementing roll stabilization and image derotation.

Yet another object of the invention is the provision of an airborne multichannel scanner system with semiconductor charge transfer device means for implementing roll stabilization and image derotation which is compatible with a LED display.

Briefly, in accordance with the invention a multichannel airborne scanner system is provided which includes semiconductor charge transfer device means for implementing aircraft stabilization and image derotation. A semiconductor charge transfer device shift register is provided for receiving the output of each channel of the multichannel detector at a variable sampling rate. A variable frequency source is connected to each shift register to effect this variable sampling rate. The sampling rate is varied during each scan of the target such that data associated with different scan angles is delayed by different amounts such that the output of the shift registers at the end of each scan effectively eliminates image rotation components. Similarly, roll stabilization is achieved by a set of variable clock-rate semiconductor charge transfer device (CTD) shift registers. The system is particularly advantageous in that the output from the CTD shift registers is compatible with LED displays.

Other objects, advantages, and features of the invention will be apparent upon reading the following detailed description of illustrative embodiments in conjunction with the drawings wherein:

FIG. 1 is a pictorial illustration of image rotation produced by a multichannel airborne scanner;

FIG. 2*a* is a diagrammatic illustration of the spatial relationship between the signal components of respective channels of a multichannel detector at three separate scan positions during a scan;

FIG. 2*b* is a diagrammatic illustration of a prior art recording technique;

FIG. 2*c* is a diagrammatic illustration of a recording technique enabled by the present invention;

Figure 1:
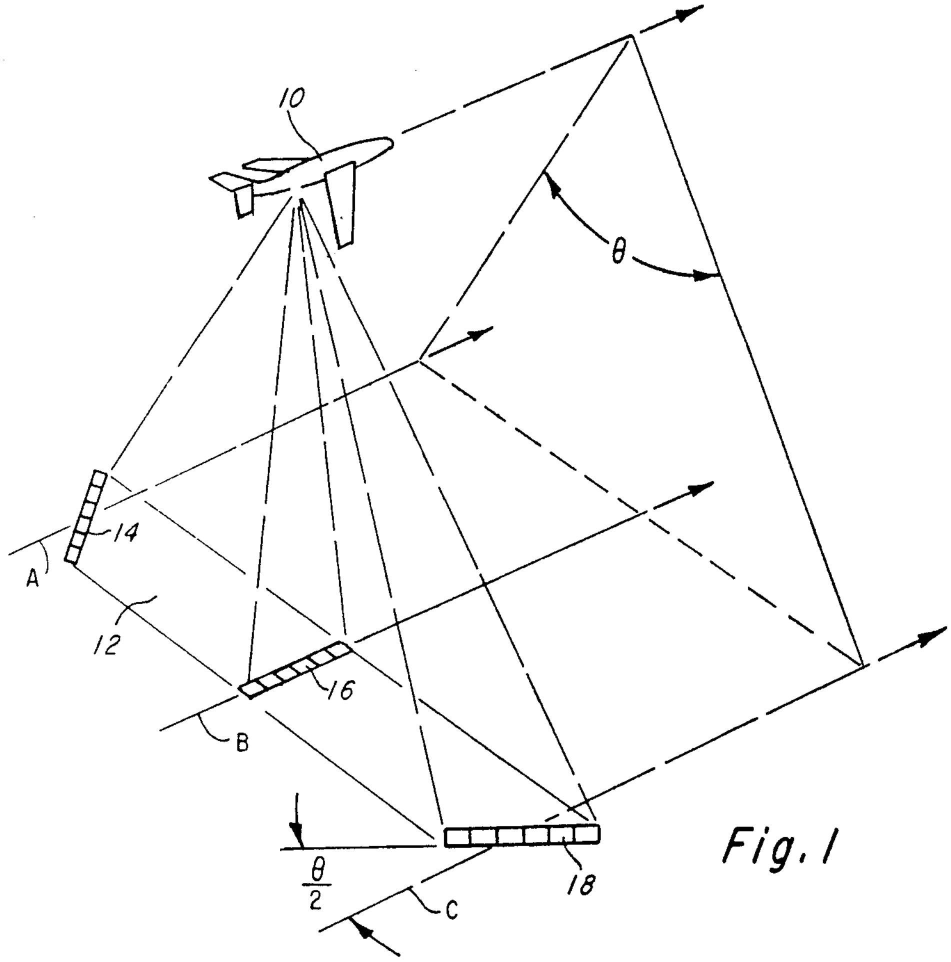
Figures 2A, 2B, 2C:
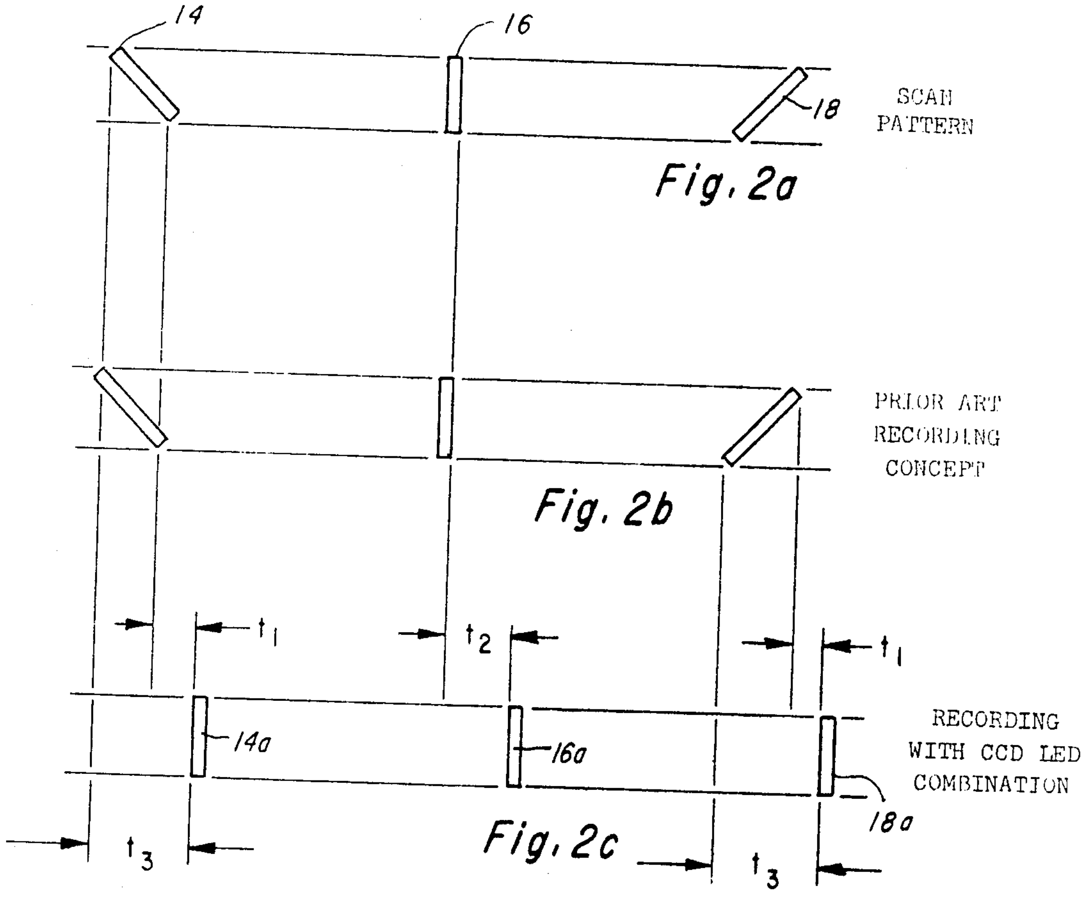

With reference now to FIGS. 1 and 2a the spatial relationship between signals produced by a multichannel detector are diagrammatically illustrated. By way of illustration, a multichannel detector (not shown) housed in the aircraft 10 scans a region 12 of a target area during one scan. The scanner has a scan angle of $\theta$. Assuming a left-to-right scan, at the initial position "A" during a scan the detector "views" a narrow region 14 of the target region 12. Each channel of the "*n*" channel detector views a different area within the region 14. It will be noted that the region 14 is skewed from the direction of flight of the aircraft by an angle $\theta/2$. This skewing results in a spatial displacement between the respective channels of the detector; i.e., the data in channel *l* can be considered to be "leading" the data in channel *n*. Later at position B during the scan when the detector views the target region 16 directly below the aircraft, there is no spatial displacement at all between the channels *l* through *n*. Finally, at position C at the end of the scan, when the detector views region 18 of the target, the data is again spatially displaced, i.e., distorted, and here channel *l* can be considered as lagging data in channel *n*.

One technique for recording data without the distortion effected by image rotation is to in essence rotate the recorder to match the rotation of the image. The "prior art" technique is shown in FIG. 2*b*. As previously noted, a major limitation on this technique is the fact that such remote and hard-shaft mechanical recorders cannot realistically utilize LED displays.

With reference to FIG. 2*c* there is illustrated a recording format enabled by the present invention which is compatible with LED displays. It can be seen in FIG. 2*c* that spatial displacement of the data detected by the various channels of the detector has been removed. The data is shown again at three positions of the scan, 14*a*, 16*a*, and 18*a*. It will be noted that the data at 14*a*, 16*a*, and 18*a* is delayed in time from that detected at 14, 16, and 18. Further, and more importantly, the data in channel *l*, e.g., has been delayed by an amount which is different than the amount of delay in channel *n*. By way of example, data in channel *l* at position 14a has been delayed by a time $t_3$, while data in channel *n* has been delayed by a duration of only $t_1$.

Figure 4:
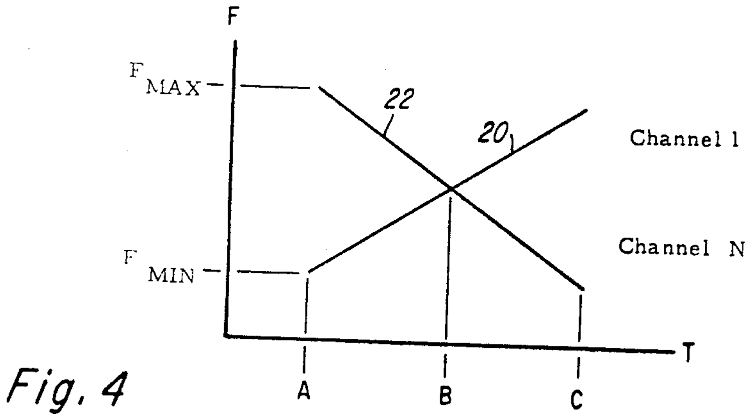
FIG. 4 is a graphic illustration of the variable clock rate suitable for sampling channels *l* and *n* of a multichannel scanner system in accordance with a preferred embodiment of the invention.

At location 16*a*, on the other hand, data in channel *l* and channel *n* has been delayed by the same amount of time $t_2$, while with respect to scan position 18*a*, data in channel *l* is delayed by only $t_1$, while data in channel *n* is delayed by $t_3$. It can be seen that for a typical scanning system such as shown in FIG. 1, a linear variation of the data sampling rate during a scan will produce a data format as shown in FIG. 2*c*. Such a variable sample rate is shown in FIG. 4 for two channels, channel *l* and *n* respectively. The channels intermediate *l* and *n* will of course fail within the bounds defined by lines 20 and 22 (FIG. 4) corresponding to the linear variation during a scan of the data sampling rate of channels *l* and *n* respectively.

Considering channel *l*, e.g., at scan position 14 data therein must be delayed by a maximum amount $t_3$ in order to coincide with data in channel *n* that is delayed by a minimum amount $t_1$. The maximum delay $t_3$ is produced by sampling the data in channel *l* at a minimum frequency rate $F_{min}$. Also, at location 14, it is desirable to delay the data in channel n by a minimum amount of time. The time $t_1$ represents the minimum delay possible with a given delay structure or, in other words, represents the maximum frequency at which the delay means can operate. Thus, in FIG. 4 at position A (FIG. 1), the data sample rate of channel *n* must be a maximum. As the scanning apparatus moves across its scan, the amount of delay between channels *l* and *n* (and channels intermediate) decreases until at position B (FIG. 1), all channels are operating at the same data sample rate. At this data rate, there is a delay to all channels of $t_2$ (FIG. 2*c*). As the scan proceeds from position B toward C, the data in channel *n* must now be delayed with respect to that in channel 1.

The technique just described with respect to eliminating rotation distortion of an image can also be used to eliminate aircraft movement distortion. In this latter case the variable frequency would be controlled by, e.g., the roll position of the aircraft.

In accordance with the invention, applicants have provided a system for variably delaying the sample rate of the respective channels of a multichannel scanner in order to produce a format as shown in FIG. 2c. A preferred embodiment of the system which utilizes CTD shift registers is illustrated in block diagram format in FIG. 3.

Figure 3:
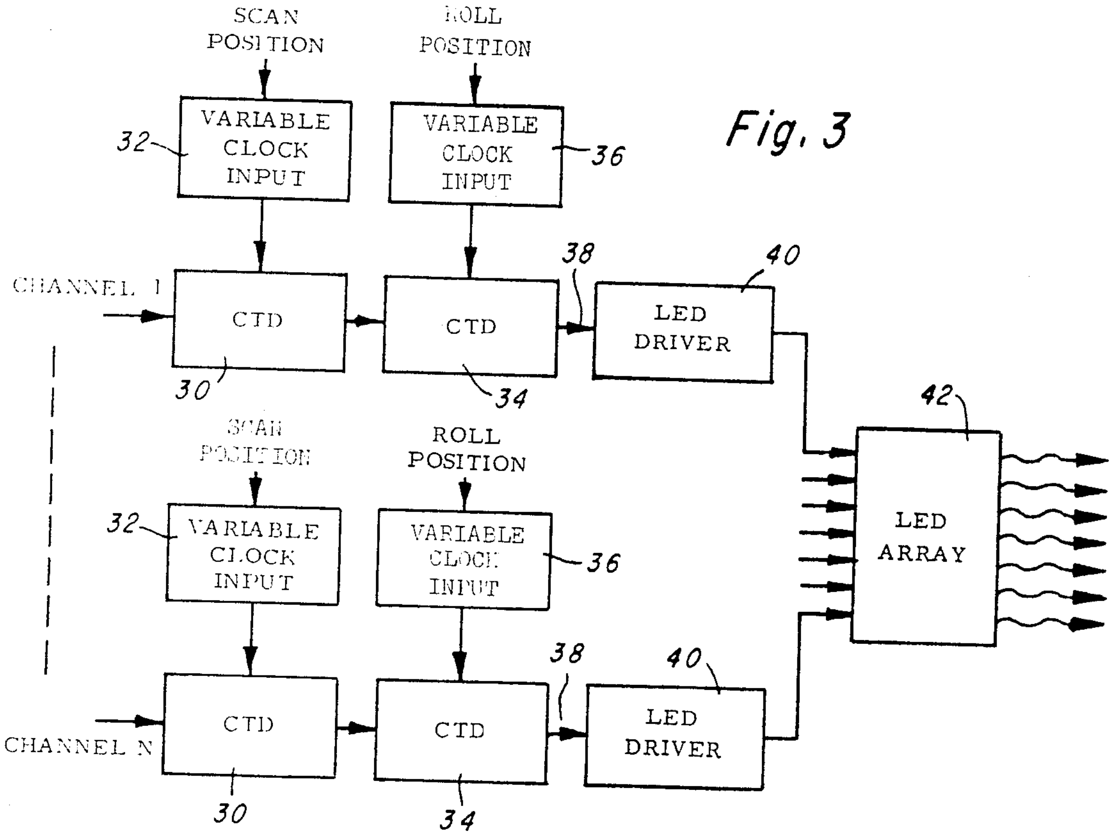
FIG. 3 is a block diagram showing implementation by CTD shift registers of aircraft motion stabilization and image derotation in accordance with the invention.

With reference now to FIG. 3, the outputs of the respective channels of an *n* channel detector are inputted into corresponding analogue delay lines 30 having variable clock rates. Preferably the analogue delay lines 30 comprise semiconductor charge transfer devices. A preferred configuration of the analogue delay lines will be described with reference to FIGS. 5–8. The rate of propagation of the data received from the detector through the analogue delay lines 30 is controlled by a variable clock input 32 which in turn is controlled by the scan position. As described with respect to FIG. 4, a clock rate which varies linearly during the scan is effected to eliminate image rotation distortion. It is appreciated of course that each analogue 30 will have a different frequency variation.

The output from the analogue delay line 30 (of each channel) is delayed by the requisite amount such that image rotation is eliminated. This signal is then applied as the input to another analogue delay line 34 having a variable frequency capability. This analogue delay line is also advantageously defined by a semiconductor CTD configuration. The frequency of the analogue delay lines 36 is in turn controlled by the aircraft position, such as the roll position. The output 38 from the delay line 34 is now free from roll distortion and image rotation distortion.

Variable clock inputs suitable for those required at 36 and 32 can, for example, be provided by separate voltage controlled oscillators. Such oscillators are well known in the art and need not be described in more detail herein.

The output 38 is amplified by a suitable LED driver 40 and is connected to a LED display 42. Suitable driver circuits 40 and displays 42 are also well known and are described in the literature.

In accordance with the invention, the analogue shift registers are defined by semiconductor charge transfer device shift registers. Utilization of these devices makes the invention feasible in that they provide means for sampling the detector array output at a variable clock rate. Since analogue data is involved, the configuration of the CTD shift register is important. Many serial shift register configurations are generally unacceptable in that too many charge transfers are required and since a certain portion of the charge is lost during each transfer, noise levels become prohibitive. In accordance with the invention, and with reference to FIGS. 5–8, a serial-parallel-serial analogue delay line configuration suitable for use with the invention will be described. This configuration and its operation is more fully described in U.S. application Ser. No. 207,905 filed Dec. 14, 1971 in the name of Collins et al., assigned to the assignee of the present invention, hereby incorporated by reference.

Briefly, semiconductor charge transfer devices provide the advantage of simplicity of fabrication, high density, high yield, low power, and low cost. Suitable semiconductor charge transfer devices include bucket-brigade configurations of insulated gate field-effect transistors (BB) and semiconductor charge coupled devices (CCD). The semiconductor charge transfer device shift registers are analogue in nature, the quantity of charge stored corresponding to the amplitude of the signal.

One factor of importance for consideration in semiconductor charge transfer device shift registers is the charge transfer efficiency. Basically, the charge transfer efficiency determines the number of transfers, that is, the total length of the transfer chain for an analogue data system. When the information is being transferred along the shift register, a portion of the charge is lost. By way of example, it is reported by Bertrim, "Application of the Charge Coupled Device Concept to Solid State Image Sensors" paper 5C.1. IEEE INTERNATIONAL CONVENTION, Mar. 22–25, 1971, New York (7108–IEEE) that a bucket-brigade operating at 5 MHz has a transfer efficiency of approximately 99.7 percent while charge-coupled devices operated at about 2 MHz have a 99.99 percent charge transfer efficiency and that at 6.5 MHz they operate with greater than 99.9 percent charge transfer efficiency.

Generally, the charge transfer efficiency increases as the clock frequency decreases and thus lower clock frequencies increase the charge transfer efficiency. However, at low frequencies the phenomenon of storage time limits operation. That is, in bucket-brigades the source and drain leakage current discharges the bucket potential while in charge-coupled devices the bulk diffusion or the surface state generation current fills the "potential well." The maximum time during which charge can remain in a potential well or at a bucket without degradation is generally referred to as the storage time.

Figure 5:
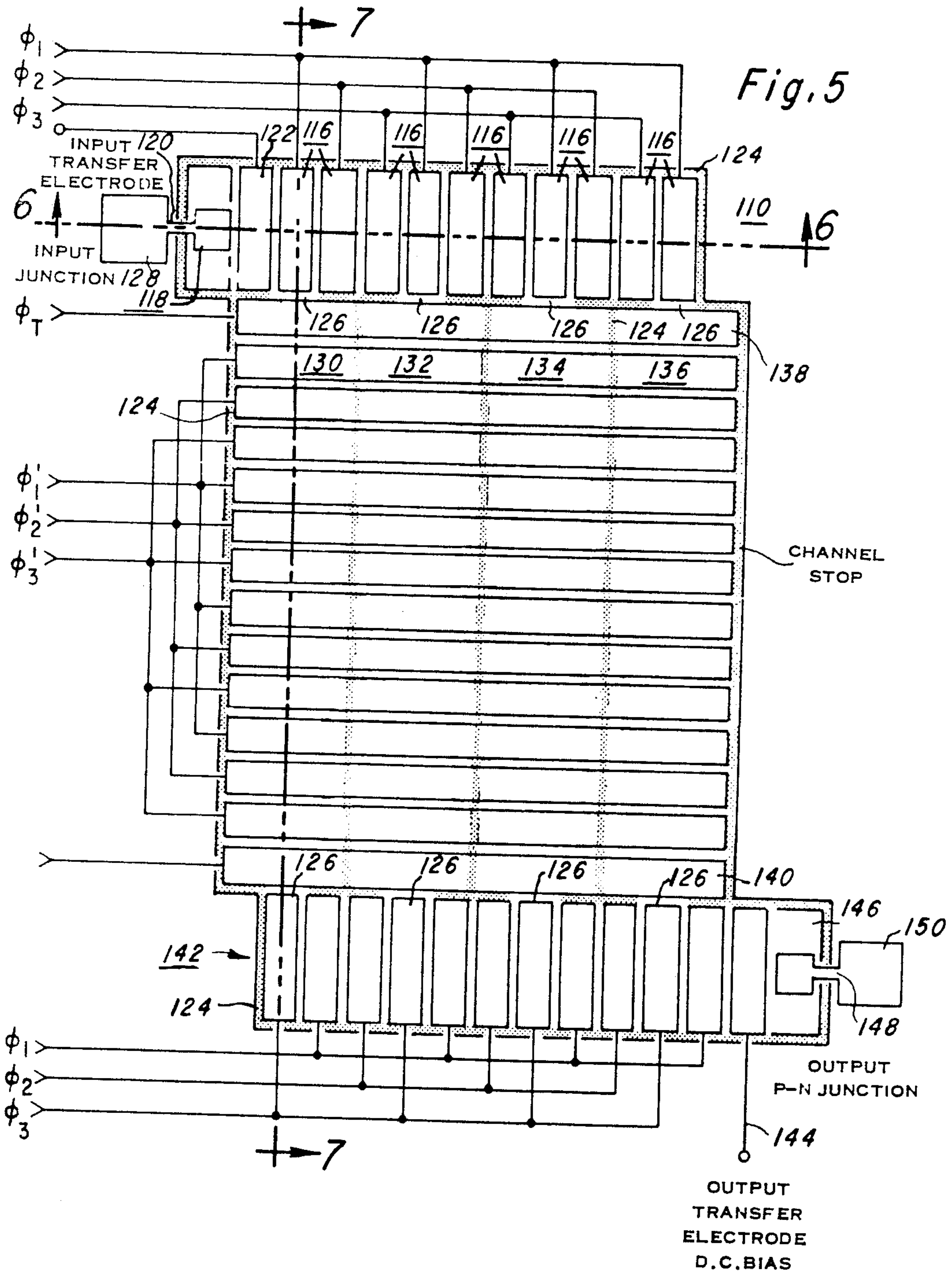
FIG. 5 is a plan view of a particularly advantageous CTD shift register configuration for use with the present invention.
Figure 6:
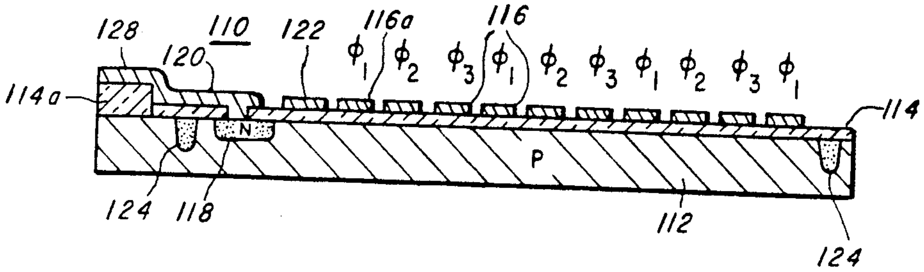
FIGS. 6 and 7 are cross-sectional views of FIG. 5.
Figure 7:
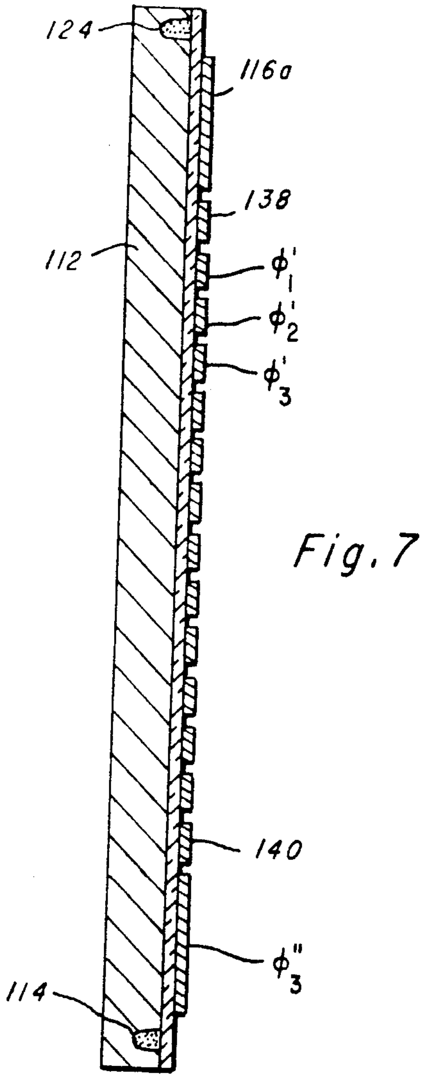

With reference now to FIGS. 5–7, a serial-parallel-serial analogue delay line is illustrated. A charge-coupled device shift register is illustrated generally at 110 and is defined to overlie a first region of a semiconductor substrate 112. The substrate may, by way of example, comprise p-type silicon, preferably having a resistivity of 50*r*-cm or greater. It is understood, of course, that an n-type silicon substrate or other semiconductor material substrates may be utilized if desired. A thin insulating layer 114 is formed to overlie one surface of the substrate 112. This insulating layer may, for example, comprise silicon oxide or silicon nitride or a combination of insulating materials formed to a thickness generally on the order of about 1,000 A. A plurality of elongated substantially parallel electrodes 116 are defined to overlie the surface of the insulating layer 114. In the embodiment illustrated each set of three successive electrodes defines one bit of the charge-coupled shift register. Three separate clocks, $\phi_1$, $\phi_2$, and $\phi_3$, are respectively connected to successive electrodes in a set. A region 118 of opposite conductivity type is formed in the surface of the substrate 112. This region may be formed by any of various techniques known to those skilled in the art, such as by ion implantation, diffusion, etc. A conductive lead 120 ohmically contacts the region 118. Input information to the shift register 110 is applied via the conductive lead 120. A transfer electrode 122 is formed to overlie the insulating layer 114 and is disposed intermediate the region 118 and the first electrode 116*a* of the shift register 110. The transfer electrode 122 is effective to transfer electrical charge stored by the p-n junction capacitance of the region 118 to a potential well underlying electrode 116*a*. A channel stop region 124 of p+ conductivity type (for the situation where a p-type substrate is utilized) is formed around the periphery of the entire memory and between the parallel data rows. It will be noted (reference FIG. 5) that the region 124 is not formed in regions such as 126 of the semiconductor 112 underlying electrodes 116 which are connected to phase 1 of the clock.

The contact pad 128 for the conductive lead 120 is preferably formed over an expanded area overlying a thick oxide region 114*a* such as illustrated in FIG. 6.

Four columns of shift registers are illustrated generally at 130, 132, 134, and 136. These shift registers may be similar to the shift register 110 above described. Again each set of three successive electrodes defines one bit of data. These electrodes are respectively biased by a second set of clocks $\phi'_1$, $\phi'_2$, and $\phi'_3$. A transfer electrode 138 is effective to transfer data from respective bits of the shift register 110 into the shift registers 130, 132, 134, and 136. Electrical charge, i.e., analogue data, is transferred along a surface region of the substrate 110 through the regions 126 where the channel stop regions are not formed. In regions where the channel stop regions are formed, electrical charge is prevented from being transferred inadvertently. The structure of the column shift register 130, for example, may better be seen with reference to FIG. 7.

An additional transfer electrode 140 is effective to transfer the data from the shift registers 130, 132, 134, and 136 into corresponding bits of the shift register shown generally at 142. The shift register 142 may be similar to the shift register 110. Clocks $\phi_1$, $\phi_2$, and $\phi'_3$ are connected to successive electrodes of each set of three electrodes of the shift register 142. An output transfer electrode 144 removes data from the shift register 142. This data is detected by a p-n junction in a region of opposite conductivity type 146 which may, by way of example, be similar to the p-n junction region 118. Ohmic connection is made to the p-n junction by the conductive lead 148 and the output taken from the expanded contact 150.

In operation of the memory illustrated in FIGS. 5–7, three sets of three-phase clocks are utilized. In an N × N matrix the clock used to drive the serial input, such as shift register 110 and serial output, such as shift register 142, would run at "N" times the rate of the internal parallel clocks, $\phi'_1$, $\phi'_2$, and $\phi'_3$. Thus, by way of examply, in a 100 × 100 matrix with a serial clock rate of 10 MHz the parallel clock rate would only be 100 KHz.

It will also be noted that the serial-parallel-serial analogue memory operates in a continuous serial data mode, i.e., a continuous stream of analogue data is inputed to and outputed from the memory at all times. The two transfer electrodes 138 and 140 are used in the parallel section of the memory to facilitate this operation. In addition, the channel-stop regions 124 are utilized to prevent the transfer of charge at undesired locations.

For the embodiment illustrated, a signal will come out of an N × N memory after N (N + 1) clock cycles after experiencing 2 (3N) + 2 electrode transfers.

Figure 8:
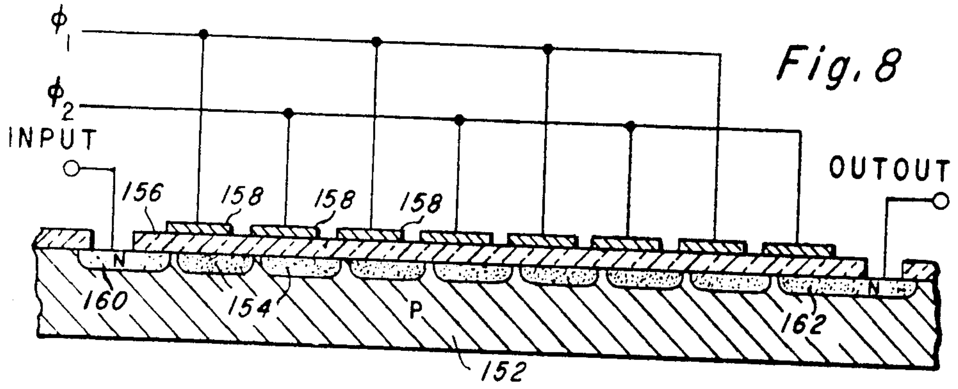
FIG. 8 is a cross-sectional view of a CTD bucket brigade shift register configuration that can be used for the variable frequency shift register of the invention.

With reference to FIG. 8, there is illustrated in cross section a bucket-brigade shift register suitable for use with the present invention. The bucket-brigade includes a semiconductor substrate of one conductivity type such as p-type silicon at 152. Regions of opposite conductivity type as shown generally at 154 form the source and drain of the insulated gate field-effect transistors. These regions may be formed, for example, by conventional diffusion techniques or by ion implantations, etc. A relatively thin insulating layer 156 of, for example, silicon oxide, silicon nitride or other insulating material may be formed to a thickness of approximately 1,000 A. Conductive electrodes 158 are formed over the insulating layer 156. In the bucket-brigade configuration the gate electrode typically extends over a greater portion of the region 154 of the transistor to enhance Miller capacitance and to facilitate storage of electrical charge. It is understood by those skilled in the art that typically data is stored in only every other bucket of the bucket-brigade. Data is inputed and outputed via ohmic contacts in p-n junction regions 160 and 162. Clock pulses $\phi_1$ and $\phi_2$ are successively applied to adjacent gates 158 to effect shift register operation.

In the described system with a 90° field of view, an 8 × 8 serial-parallel-serial configuration as above described is effective to provide image derotation. For ±10° of roll stabilization, a 64 × 64 matrix is sufficient. Other systems and stabilization requirements may require more or less transfer capabilities.

While the present invention has been described with respect to specific illustrative embodiments, it will be apparent to those skilled in the art that various modifications can be made without departing from the spirit or scope of the invention.

What is claimed is:

1. An airborne scanner system including in combination airborne detector means having a plurality of discrete channels for simultaneously scanning a target and producing outputs corresponding thereto;

a plurality of variable frequency analogue delay lines respectively disposed for sampling said outputs, each of said delay lines including control means for selectively varying the frequency at which said outputs are sampled whereby the data in each channel corresponding to a particular detector scan angle is simultaneously present at the outputs of said plurality of delay lines; and display means coupled to the outputs of said delay lines for providing a visual image corresponding to said target.

2. An airborne scanner system as set forth in claim 1 wherein said analogue delay lines are respectively semiconductor charge-transfer-device shift registers.

3. An airborne scanner system as set forth in claim 2 wherein said frequency control means for each shift register include a voltage controlled oscillator for receiving a variable voltage corresponding to the detector scan angle.

4. An airborne scanner system as set forth in claim 3 wherein said voltage controlled oscillator is effective to produce a linear variation in the clock rate of its corresponding shift register during each scan of said detector.

5. An airborne scanner system as set forth in claim 4 wherein said display means comprise a light emitting diode display.

6. A multichannel airborne scanner system having an output substantially free from aircraft motion and image rotation affects comprising:

a multichannel detector for simultaneously producing a plurality of discrete channels of time varying data during each scan of a target, said data including distortion components resulting from aircraft roll and image rotation distortion corresponding to the scan angle of the detector;

a first plurality of variable frequency analogue delay lines respectively coupled to the outputs of said discrete channels of data, the frequency of each delay line selectively variable responsive to the frequency of clock signals applied thereto;

first frequency control means for producing a plurality of clock signals of variable frequency respectively coupled to each of said first plurality of analogue delay lines, said first frequency control means operable to produce clock signals having a frequency corresponding to the scan angle of said detector whereby the outputs of each of said first plurality of delay lines corresponding to a given scan position occur simultaneously, thereby removing image rotation affects from said detector outputs;

a second plurality of variable frequency analogue delay lines coupled to the outputs of said first plurality of delay lines, the frequency of each of said second plurality of delay lines selectively variable responsive to the frequency of clock signals applied thereto;

second frequency control means for producing a plurality of clock signals of variable frequency respectively coupled to each of said second plurality of delay lines, said second frequency control means operably responsive to the aircraft position to produce said plurality of clock signals having a frequency corresponding to the aircraft roll position whereby roll distortion is effectively removed from the detector outputs; and display means coupled to the outputs of said second plurality of delay lines for providing a visual image of said target substantially free from distortion.

7. A multichannel airborne scanner system as set forth in claim 6 wherein said first and second plurality of analogue delay lines respectively comprise semiconductor charge transfer device shift registers.

8. A multichannel airborne scanner system as set forth in claim 7 wherein said first and second frequency control means respectively comprise voltage controlled oscillators.

9. A multichannel airborne scanner system as set forth in claim 8 wherein said display comprises a light-emitting diode display.

10. A multichannel airborne scanner system as set forth in claim 7 wherein said first frequency control means is effective to produce a plurality of clock signals respectively having, during each scan of said detector, a linear variation in clock frequency.

* * * * *